June 22, 1926.
F. A. FINCHAM
1,589,876
HARROW
Filed April 19, 1923   3 Sheets-Sheet 3
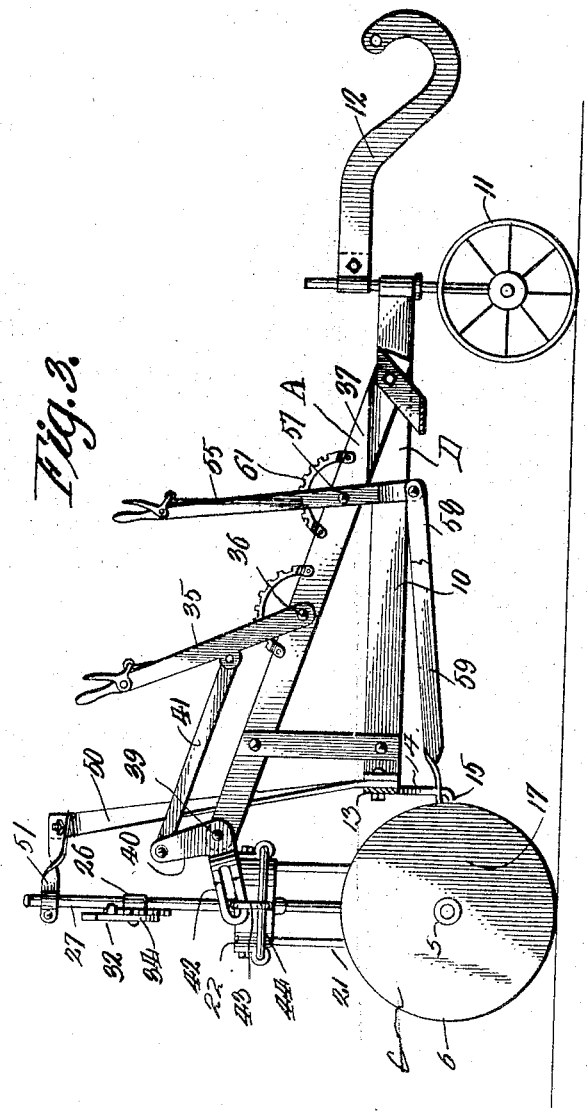
WITNESSES
Inventor
FRED A. FINCHAM
By Richard B. Owen, Attorney Patented June 22, 1926.

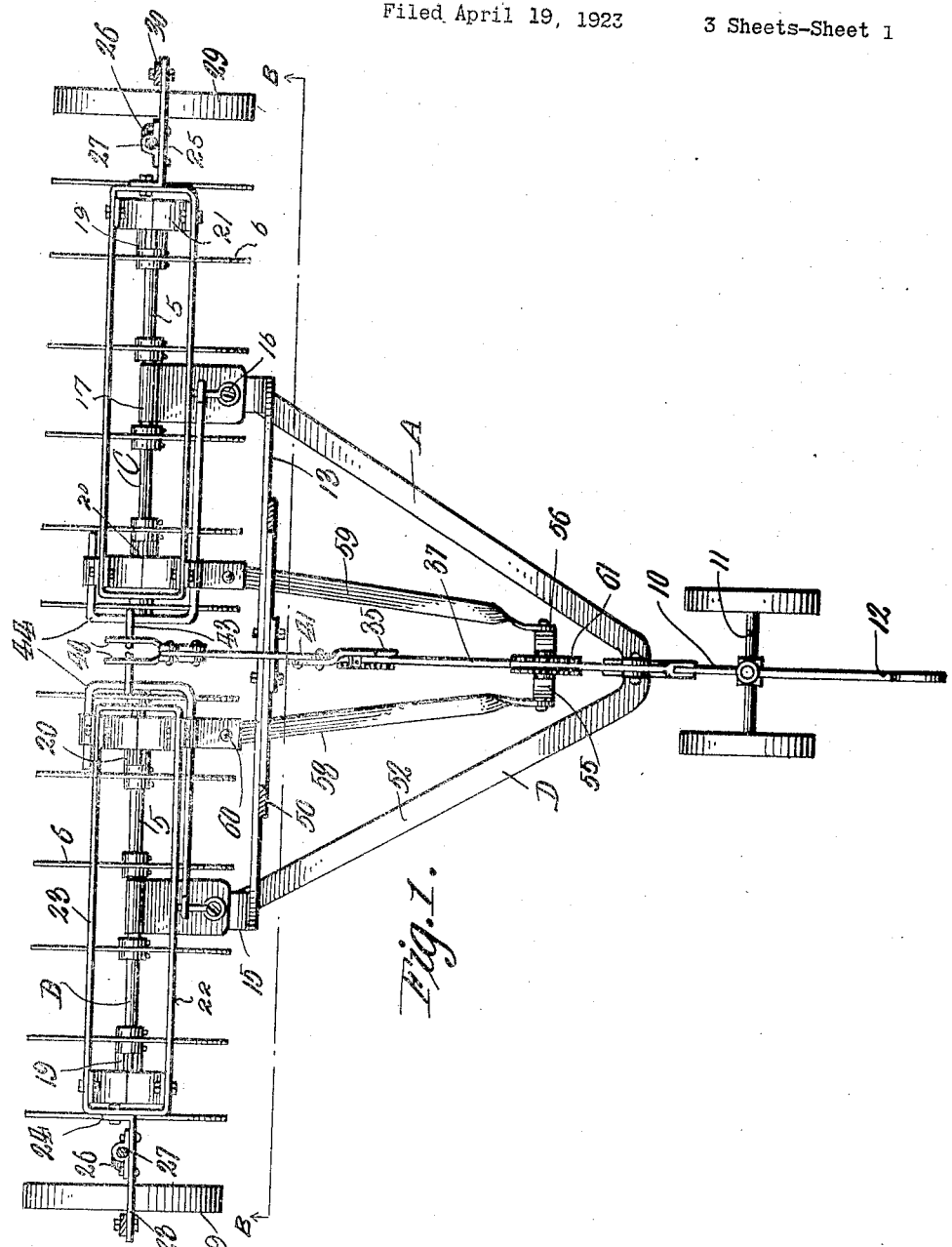

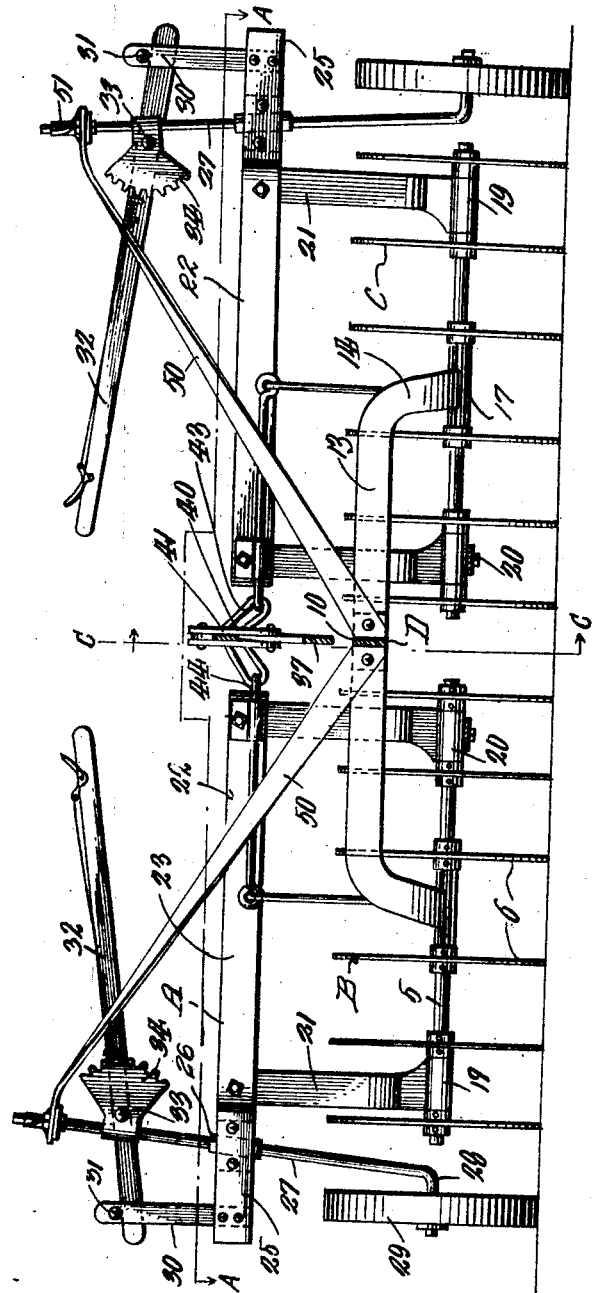

1,589,876

UNITED STATES PATENT OFFICE.

FRED A. FINCHAM, OF BLUE RAPIDS, KANSAS.

HARROW.

Application filed April 19, 1923. Serial No. 633,251.

This invention relates to farming implements and the primary object of the present invention is to provide novel means for mounting a disk harrow on a wheeled carrier and means for raising and lowering the harrow on the carrier, whereby the harrow can be readily moved from one field to another or along a roadway without hurting the harrow disks.

A further object of the invention is to provide an improved farm implement embodying a frame, gangs of ground working disks carried by the frame, means for adjusting the angle of the gangs of ground working disks in relation to the frame, and means for raising and lowering the disk gangs in relation to the frame and to the ground.

A still further object of the invention is to provide an improved farm implement of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a section through the improved disk harrow taken on the line A—A of Figure 2.

Figure 2 is a section taken through the improved harrow on the line B—B of Figure 1.

Figure 3 is a section taken at right angles to Figure 2 on the line C—C of Figure 2.

Referring to the drawings in detail, wherein similar reference characters designate corresponding parts throughout the several views, the letter A generally indicates the improved farm implement constructed in accordance with this invention, which includes a pair of disk harrow gangs B and C and the main frame D therefor.

The disk harrow gangs B and C are of the ordinary or any preferred construction and each embodies a shaft 5 on which are mounted at predetermined equidistantly spaced points the harrow disks 6.

The main frame D comprises a centrally disposed forwardly extending beam 10, the forward end of which carries a truck 11 to which can be attached any preferred type of draft appliance 12. The rear end of the beam 10 has rigidly secured thereto the transversely extending cross bar 13 which is of substantially an inverted U-shape when viewed in front elevation. This transversely extending cross bar 13 has its terminals bent downwardly and outwardly as at 14, and these bent down terminals terminate in rearwardly extending attaching feet 15 which are pivotally connected by means of pivot bolts or the like 16 to bearings 17 which rotatably receive the axles or shafts 5 of the disk gangs B and C. Bearings 19 and 20 are carried by each end of each shaft 5 of the gang disks B and C for supporting the said gangs, and these bearings are carried by brackets 21 which are secured to transversely extending disk gang auxiliary supporting frames or members 22. These disk gang auxiliary supporting members or frames 22 embody spaced parallel bars 23 and connecting cross bars 24. The outer terminals of the harrow disk gang auxiliary supporting frames or members 22 carry outwardly extending supporting arms 25 to which are secured sleeves or bearings 26. These sleeves or bearings 26 slidably support posts 27, the lower terminals of which carry outwardly extending axles 28 upon which are rotatably mounted the ground engaging wheels 29 which cooperate with the truck 11 for supporting the said harrow disk gangs. The extreme outer ends of these arms 25 carry upstanding supporting brackets 30. These brackets 30 have suitable bolts or the like 31 carried by the upper end thereof, which are adapted to be engaged by the outer ends of the operating levers 32. The operating levers 32 are pivotally secured intermediate their ends as at 33 to suitable quadrants 34 which are rigidly connected with the posts 27 in any preferred way. It is thus obvious that by raising and lowering the outer ends of the levers 32 that the frame D can be raised and lowered on the posts 27. These levers preferably carry suitable dogs or the like for engaging the quadrants to permit of the holding of the frame D in an adjusted position. The movement of the levers 32 of course raises and lowers the outer ends of the frame members 22 and in order to permit the raising and lowering of the inner ends thereof, a second operating lever 35 is provided. This operating lever 35 is pivotally secured as at 36 to a rearwardly and upwardly extending beam 37 which is secured in any preferred way to the forward end of the main beam 10. The extreme rear end of the upwardly and rearwardly extending inclined beam 37 has pivotally connected thereto as at 39 a bell crank 40 and one arm of the bell crank 40 is connected by means of a link 41 to the said operating lever 35. This bell crank lever 40 has its other arm slotted as at 42 and suitable depending links 43 are mounted in said slots and are adapted to engage yokes 44 secured to the inner ends of the frame or supporting members 22 for each of the gang disks.

By operating this lever 35 the bell crank 40 can be rocked which will of course raise or lower the inner ends of the frames or members 22.

In order to effectively guide the posts 27, outwardly extending bars 50 are carried by the rear end of the main beam 10 and these bars have their outer ends provided with guide sleeves 51 for receiving the posts 27. The beam 10 adjacent to its forward end carries the rearwardly and downwardly inclined reinforcing bars 52, which are pivotally connected to the bearings carried by the feet 15.

In order to effectively change the angle of the gangs of harrow disks B and C, I provide levers 55 and 56 which are pivoted at a point intermediate their ends by means of a pivot bolt 57 on the rearwardly extending beam 37. The lower ends of these levers 55 and 57 have pivotally secured thereto respectively rearwardly extending operating links 58 and 59. These links are connected by means of pivot bolts 60 at their rear ends to the bearings 20 which are disposed at the inner ends of the supporting frames or members 22 as clearly shown in Figures 1 and 2 of the drawings. These levers 55 and 56 are held in suitable adjusted position by means of segment racks 61 carried by the beam 37 and dogs carried by the levers 55 and 56.

It is obvious that when the levers 55 and 56 are operated that the links 58 and 59 will be moved backward or forward, as the case might be, which will swing the auxiliary frame on the pivot pins 16 and thus change the angle of the said auxiliary frames and the gangs of disks. During the swinging movement of the harrow disk gangs the links 43 will slide on the yokes 44.

From the foregoing description it can be seen that I have provided an improved harrow of exceptionally simple and durable construction which is so constructed that the harrow disk gangs can be raised or lowered in relation to a supporting frame therefor so as to effectively prevent injury to the disks when the disks are not in harrowing position.

Changes in details may be made without departing from the spirit or the scope of this invention.

What I claim as new is:

1. An agricultural implement comprising a main frame including a transversely extending inverted U-shaped beam, bearings pivotally secured to the terminals of the transverse beam, gangs of harrow disks supported by said bearings, means supported by the main frame operatively connected with the inner ends of the gangs of harrow disks for changing the inclination of the said gangs relative to the line of draft, means for raising and lowering the inner ends of the gangs of harrow disks from said main frame and independent means for rasing and lowering the outer ends of the gangs of harrow disks.

2. An agricultural implement embodying a main frame including a longitudinally extending main beam, a wheeled truck carried by the forward end of the main beam and a cross beam rigidly secured to the rear end of the main beam, bearings pivotally connected to the terminals of the cross beam, gangs of harrow disks supported by said bearings, auxiliary frames mounted above the gangs of disks, bearings carried by the auxiliary frames for receiving the gangs of disks, posts slidably supporting the outer ends of the auxiliary frames, wheels carried by said posts, means for adjusting the auxiliary frames on said posts, and means for raising and lowering the inner ends of the auxiliary frame members associated with said main beam.

3. An agricultural implement embodying a main frame including a longitudinally extending main beam, a wheeled truck carried by the main beam and a cross beam rigidly secured to the rear end of the main beam, bearings pivotally connected to the terminals of the cross beam, gangs of harrow disks supported by said bearings, auxiliary frames mounted above the gangs of disks, posts slidably supporting the outer ends of the auxiliary frames, wheels carried by said posts, means carried by said posts for adjusting the auxiliary frames on the said posts, and means carried by the main frame and having pivotal connections with the inner ends of the auxiliary frames for raising and lowering the same.

In testimony whereof I affix my signature.

FRED A. FINCHAM.